United States Patent
Kimura et al.

(12)

(10) Patent No.: US 6,466,732 B1
(45) Date of Patent: Oct. 15, 2002

(54) INFORMATION RECORDING SYSTEM AND INFORMATION RECORDING METHOD

(76) Inventors: Tomohiro Kimura, c/o Pioneer Corporation, Tokorozawa Works, 2610, Hanazono 1-chome, Tokorozawa-shi, Saitama (JP); Shigeru Adachi, c/o Pioneer Corporation, Tokorozawa Works, 2610, Hanazono 1-chome, Tokorozawa-shi, Saitama (JP)

( * ) Notice: Subject to any disclaimer, the term of this patent is extended or adjusted under 35 U.S.C. 154(b) by 0 days.

(21) Appl. No.: 09/396,450

(22) Filed: Sep. 15, 1999

(30) Foreign Application Priority Data

Sep. 16, 1998 (JP) .......................................... 10-262094

(51) Int. Cl.[7] .............................................. H04N 5/93
(52) U.S. Cl. .............................. 386/52; 386/111; 360/8
(58) Field of Search ......................... 386/33, 111–112, 386/52; 375/240.26, 240.28, 240.12; 382/232, 239, 248; 360/8

(56) References Cited

U.S. PATENT DOCUMENTS 6,327,421 B1 * 12/2001 Tiwari et al. .................. 386/68
6,347,117 B1 * 2/2002 Kato et al. ............. 375/240.12
6,393,574 B1 * 5/2002 Kashiwagi et al. ......... 713/400

FOREIGN PATENT DOCUMENTS

| EP | 0 447 247 A2 | 9/1991 |
| EP | 0 514 865 A2 | 11/1992 |
| EP | 0 597 647 A2 | 5/1994 |
| WO | 97/03443 | 1/1997 |

OTHER PUBLICATIONS

Japanese Abstract No. 09200740, dated Jul. 31, 1997.
Japanese Abstract No. 11243529, dated Sep. 7, 1999.
Japanese Abstract No. 07135651, dated May 23, 1995.

* cited by examiner

Primary Examiner—Thai Tran
Assistant Examiner—Christopher Onuaku
(74) Attorney, Agent, or Firm—Sughrue Mion, PLLC

(57) ABSTRACT

To code and record new information to be recorded on DVD-R/W 1 on which old information is already coded and recorded, an old coding parameter used to code the old information is aquired (step S6, S8, S10, S11), a new coding parameter used to code the new information is set so as to continue with the aquired old coding parameter (step S14, S15, S21, S22, S23), and the new information is coded using the setup new coding parameter and is recorded.

8 Claims, 12 Drawing Sheets

BLOCK DIAGRAM TO SHOW GENERAL CONFIGURATION OF INFORMATION RECORDING AND REPRODUCING SYSTEM OF EMBODIMENT

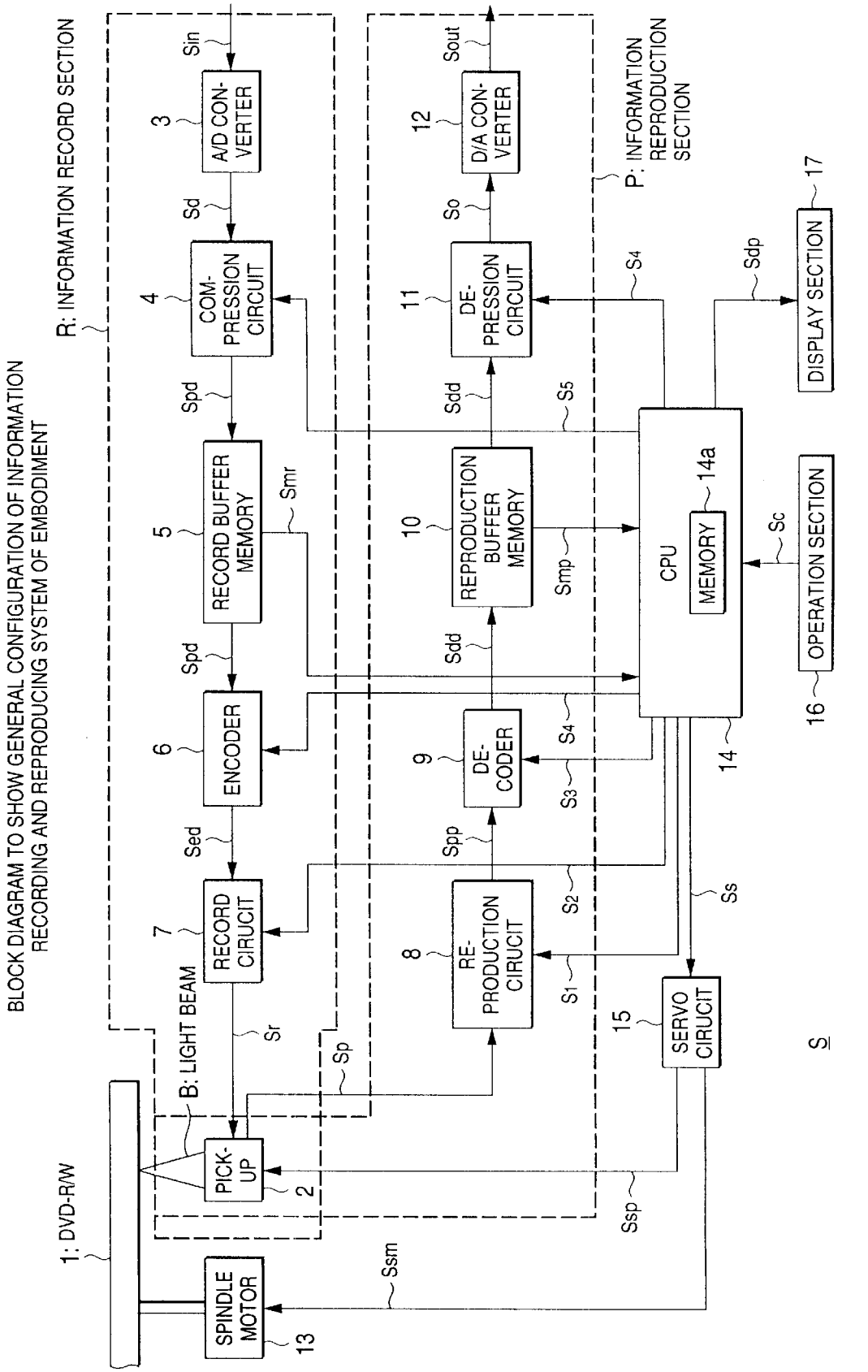

BLOCK DIAGRAMS TO SHOW GENERATION CONFIGURATIONS OF COMPRESSION CIRCUIT AND DECOMPRESSION CIRCUIT OF EMBODIMENT

FORMATS OF PACKET AND PACK

FORMATS OF PACKS

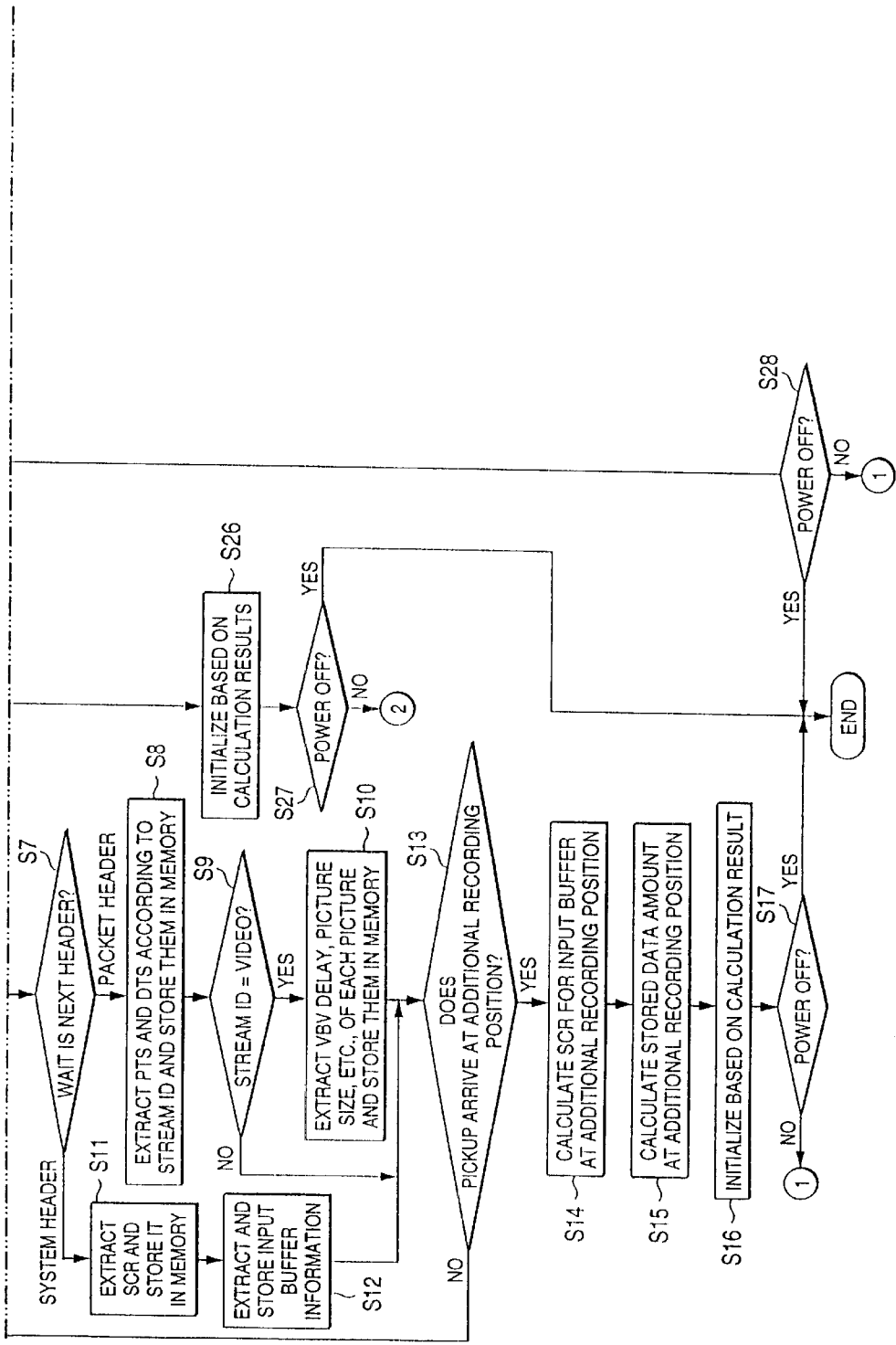

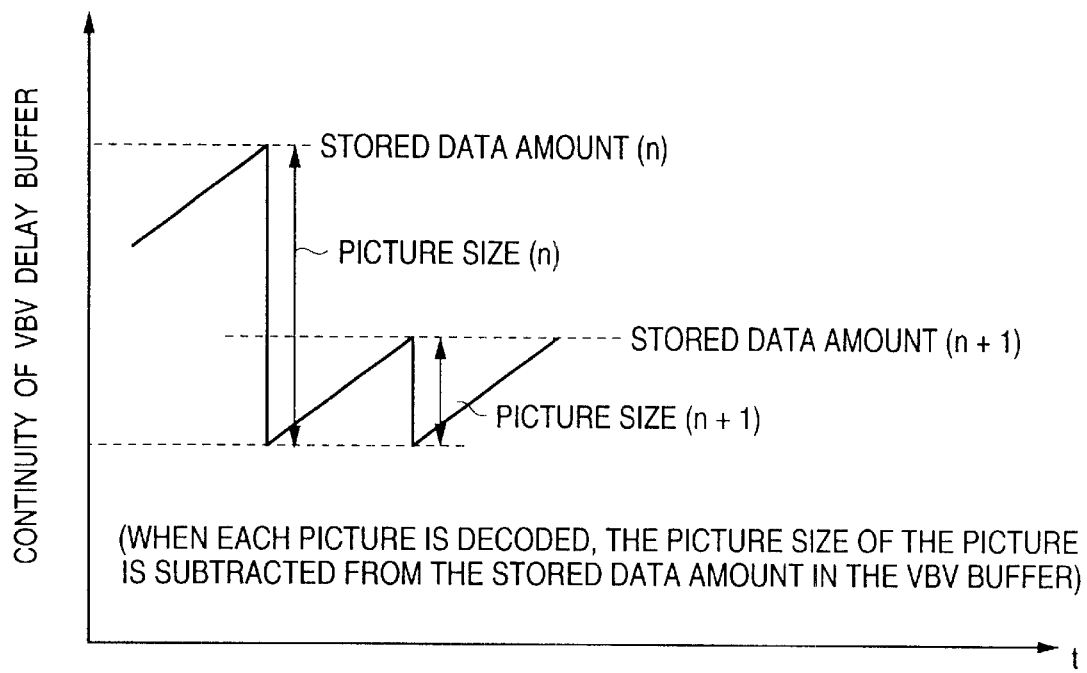

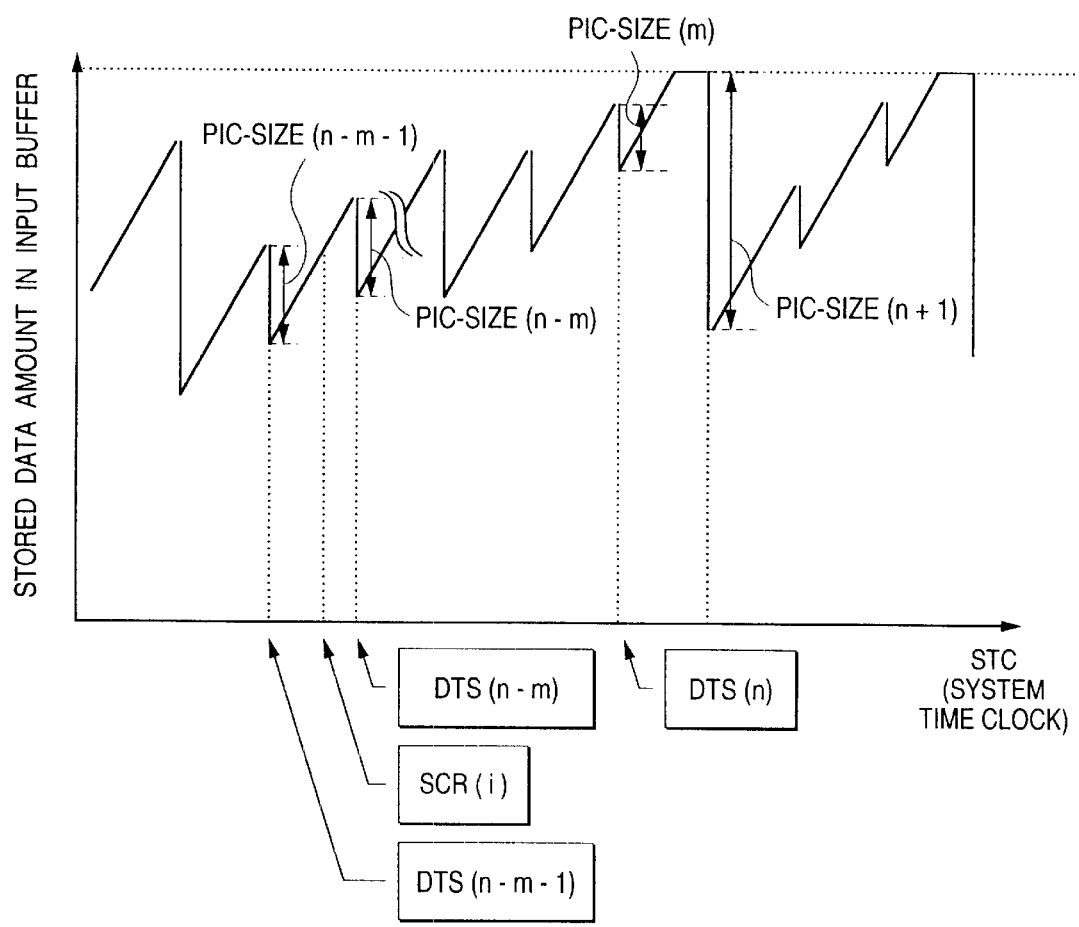

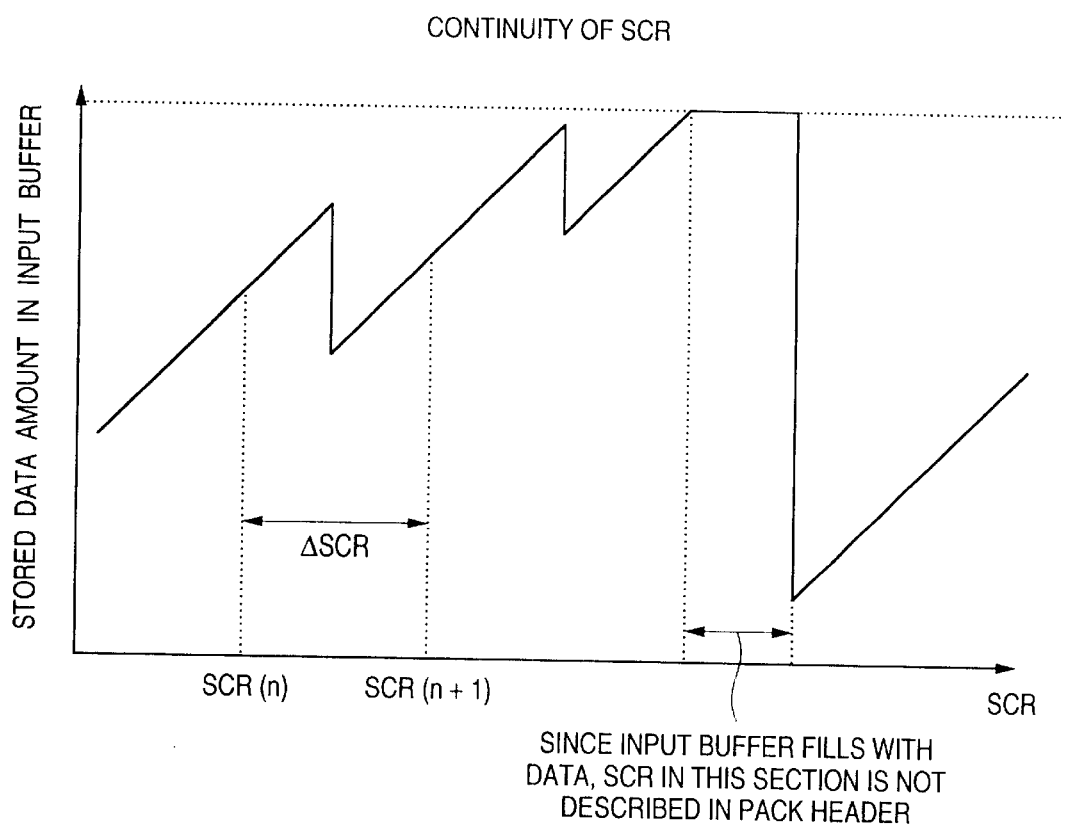

INFORMATION RECORDING SYSTEM AND INFORMATION RECORDING METHOD

BACKGROUND OF THE INVENTION

1. Field of the Invention

This invention relates to an information recording method and an information recording system for adding new record information to old record information already recorded on a record medium or replacing the old record information with new record information and more particularly to an information recording method and an information recording system for adding new record information to old record information or replacing old record information with new record information while executing coding of MPEG (Moving Picture Experts Group), etc., for example, and executing the same coding for old record information already recorded on a record medium.

2. Description of the Related Art

Hitherto, the coding technology of MPEG has been available as a highly efficient compression coding technology for an image.

The coding technology of MPEG is a technology of making it possible to highly efficiently compress image information which essentially reaches an enormous information amount by executing variable-length coding of difference information between an image to be coded and a reference image preceding the image in time sequence and a motion vector, which refers to a vector indicating the direction and amount of image motion if some image motion exists between the reference image and the image to be coded, in macro block (square pixel block containing 16×16 pixels) units and transmitting or recording the result.

Since variable-length coding is executed as described above in the coding technology of MPEG, the post-compressed and coded images, which will be hereinafter referred to as pictures, differ in data amount.

Therefore, the encoder for executing the coding sets the amount of data to be coded while simulating the stored data amount in reproduction buffer memory (buffer memory for temporarily storing decoded image and adjusting the output timing, etc.,) in a decoder at the coding time so that when coded image is decompressed and decoded in the decoder, an overflow or an underflow does rot occur in the reproduction buffer memory in the decoder (if an overflow occurs, an undecoded image occurs; if an underflow occurs, decoded image discontinues), whereby an overflow or an underflow is avoided.

By the way, according to the highly efficient compression coding technology described above in the related art, to start recording a new image on a record medium, it is necessary to initialize all of various coding parameters involved in the coding (parameters to be set at the coding time, such as VBV (Video Buffering Verifier) delay, picture size, temporary reference, and picture coding type).

[Means for Solving the Problem]

However, according to the related art, for example, to maintain scene transitions in recording for once recording an image on a record medium and then recording a new image relevant to the previously recorded image (for example, continuous with the previous image), the above-mentioned coding parameters are all initialized each time recording a new image is started, thus continuity of the coding parameters at the scene transition part is impaired. Resultantly, continuity is not set between the simulation result of the buffer memory in the decoder executed by the encoder when the last part of the previous image is coded and recorded and the simulation result of the buffer memory executed by the encoder when the first part of the new image is coded and recorded.

Thus, the stored data amount in the buffer memory in the decoder as the simulation result containing the parts before and after the scene transition part, performed by the encoder differs from the actual stored data amount in the buffer memory in the decoder for reproducing the new image as a sequence of images with respect to the previous image together with the previous image and the continuity on the MPEG standard is impaired in the part corresponding to the scene transition part. Resultantly, when the image is reproduced, an overflow or an underflow occurs in the buffer memory in the decoder after the scene transition part, in which case irregularity may be caused in the image as a result.

SUMMARY OF THE INVENTION

It is therefore an object of the invention to provide an information recording method and an information recording system capable of coding and recording a new image relevant to a previously coded and recorded old image in a similar manner and when both the old and new images are reproduced continuously, enabling the old and new images to be reproduced smoothly without impairing the continuity of the reproduced images at the scene transition part.

To the end, according to a first aspect of the invention, there is provided an information recording method for coding and recording new record information to be recorded on a record medium such as DVD-R/W on which old record information is already coded and recorded, the information recording method comprising the acquisition step of acquiring an old coding parameter of a coding parameter used to code the old record information, the setting step of setting a new coding parameter of a coding parameter used to code the new record information so as to continue with the acquired old coding parameter, and the recording step of coding the new record information using the setup new coding parameter and recording the new record information on the record medium.

The old coding parameter is acquired and the new coding parameter is set so as to continue with the old coding parameter, then the new record information is recorded while coding is executed. Thus, to reproduce the old record information and the new record information, the old record information and the new record information coded based on the continuous coding parameters are reproduced; the old record information and the new record information can be reproduced without becoming discontinuous therebetween.

To the end, in a second aspect of the invention, in the information recording method as set forth in the first asspect of the invention, the new record information is new record information to be recorded on the record medium so as to continue with the old record information, the acquisition step comprises the storage step of storing the old coding parameter corresponding at the termination of recording the old record information in storage means, and the read and acquisition step of reading and acquiring the stored old record information when the new record information is recorded, wherein the setting step sets the read old coding parameter as a new coding parameter, and the recording step starts coding the new record information using the setup new coding parameter and stores the new coding parameter corresponding at the termination of recording the new record information in the storage means in place of the old coding parameter.

At the termination of recording the old record information, the corresponding old coding parameter is read out and acquired from the storage means and is used as new coding parameter to start coding the new record information. Further, at the termination of recording the new record information, the corresponding new coding parameter is stored in the storage means in place of the old coding parameter. Thus, even when the new record information is the record information to be recorded continuing with the old record information, the continuity of the coding parameters is provided reliably and the new record information can be recorded.

To the end, in a third aspect of the invention, in the information recording method as set forth in the first aspect of the invention, the new record information is new record information to be recorded on the record medium so as to update a part of the old record information, the acquisition step comprises the read step of reading adjacent old record information of the old record information recorded on the record medium adjacent to the top of the area of the record medium in which the old record information of the part is recorded from the record medium, and the calculation step of calculating the old coding parameter corresponding at the termination of recording the adjacent old record information based on the read adjacent old record information.

The old record information recorded in the area adjacent to the top of the area in which new record information is to be recorded is read and old coding parameter is calculated based on the read old record information. Further, a new coding parameter is set so as to continue with the calculated old coding parameter and the new record information is coded. Thus, even when the new record information is the new record information to be recorded so as to update a part of the old record information, the continuity of the coding parameters is provided reliably and the new record information can be recorded.

To the end, in a fourth aspect of the invention, in the information recording method as set forth in any one of the first to third aspects, coding of the old record information and coding of the new record information are compression coding executed based on MPEG, and the coding parameters include at least coding parameters of VBV delay, picture size, temporary reference, picture coding type, SCR, PTS, and DTS.

To code the old record information and the new record information in MPEG, a new coding parameter is set so that the coding parameters of VBV delay, picture size, temporary reference, picture coding type, SCP, PTS, and DTS at least are made to continue. Thus, the continuity of coding between the old record information and the new record information can be maintained reliably, and the old record information and the new record information can also be reproduced while the continuity is maintained between the old record information and the new record information.

To the end, according to a fifth aspect of the invention, there is provided an information recording system for coding and recording new record information to be recorded on a record medium such as DVD-R/W on which old record information is already coded and recorded, the information recording system comprising acquisition means such as a CPU for acquiring an old coding parameter of a coding parameter used to code the old record information, setting means such as a CPU for setting a new coding parameter of a coding parameter used to code the new record information so as to continue with the old coding parameter, and recording means such as a pickup for coding the new record information using the setup new coding parameter and recording the new record information on the record medium.

The old coding parameter is acquired and the new coding parameter is set so as to continue with the old coding parameter, then the new record information is recorded while coding is executed. Thus, to reproduce the old record information and the new record information, the old record information and the new record information coded based on the continuous coding parameters are reproduced; the old record information and the new record information can be reproduced without becoming discontinuous therebetween.

To the end, in a sixth aspect of the invention, in the information recording system as set forth in the fifth aspect, the new record information is new record information to be recorded on the record medium so as to continue with the old record information, the acquisition means comprises storage means such as memory, storage control means such as a CPU for storing the old coding parameter corresponding at the termination of recording the old record information in the storage means, and read and acquisition means such as a CPU for reading and acquiring the stored old record information when the new record information is recorded, the setting means sets the read old coding parameter as a new coding parameter, and the recording means starts coding the new record information using the setup new coding parameter and stores the new coding parameter corresponding at the termination of recording the new record information in the storage means in place of the old coding parameter.

At the termination of recording the old record information, the corresponding old coding parameter is read out and acquired from the storage means and is used as new coding parameter to start coding the new record information. Further, at the termination of recording the new record information, the corresponding new coding parameter is stored in the storage means in place of the old coding parameter. Thus, even when the new record information is the record information to be recorded continuing with the old record information, the continuity of the coding parameters is provided reliably and the new record information can be recorded.

To the end, in a seventh aspect of the invention, in the information recording system as set forth in the fifth aspect, the new record information is new record information to be recorded on the record medium so as to update a part of the old record information, the acquisition means comprises read means such as a pickup for reading adjacent old record information of the old record information recorded on the record medium adjacent to the top of the area of the record medium in which the old record information of the part is recorded from the record medium, and calculation means such as a CPU for calculating the old coding parameter corresponding at the termination of recording the adjacent old record information based on the read adjacent old record information The old record information recorded in the area adjacent to the top of the area in which new record information is to be recorded is read and old coding parameter is calculated based on the read old record information. Further, a new coding parameter is set so as to continue with the calculated old coding parameter and the new record information is coded. Thus, even when the new record information is the new record information to be recorded so as to update a part of the old record information, the continuity of the coding parameters is provided reliably and the new record information can be recorded.

To the end, in an eighth aspect of the invention, in the information recording system as claimed in any of the fifth to seventh aspects, coding of the old record information and coding of the new record information are compression coding executed based on MPEG, and the coding parameters include at least coding parameters of VBV delay, picture size, temporary reference, picture coding type, SCR, PTS, and DTS.

To code the old record information and the new record information in MPEG, a new coding parameter is set so that the coding parameters of VBV delay, picture size, temporary reference, picture coding type, SCR, PTS, and DTS at least are made to continue. Thus, the continuity of coding between the old record information and the new record information can be maintained reliably, and the old record information and the new record information can also be reproduced while the continuity is maintained between the old record information and the new record information.

BRIEF DESCRIPTION OF THE DRAWINGS

In the accompanying drawings:

FIG. 1 is a block diagram to show a general configuration of an information recording and reproducing system of an embodiment of the invention;

FIGS. 7A and 7B are flowcharts showing scene transition recording according to the embodiment;

FIG. 8 is a drawing to describe continuity of VBV delay;

FIG. 10 is a drawing to describe continuity of the stored data amount in the input buffer (II); and FIG. 11 is a drawing to describe continuity of SCR.

DETAILED DESCRIPTION OF THE PREFERRED EMBODIMENTS

Figure 2A:
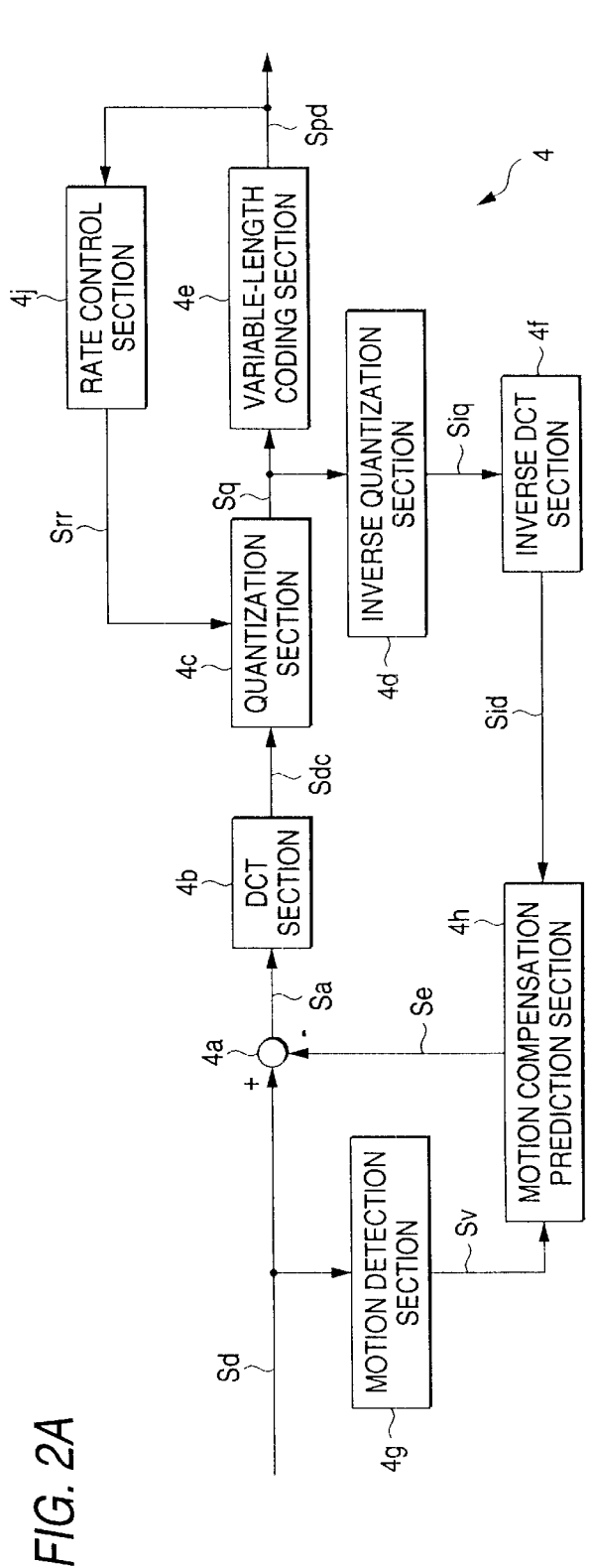
FIGS. 2A and 2B are block diagrams to snow general configurations of a compression circuit and a decompression circuit of the embodiment of the invention.

Now, a description will be given in more detail of preferred embodiments of the invention with reference to the accompanying drawings.

The embodiment of the invention to be described is an embodiment provided by applying the invention to an information recording and reproducing system that can record and reproduce information on DVD-R/W (DVD-Read/Write) of a disk-like record medium where information can be optically recorded and reproduced more than once. The DVD-R/W is an optical disk which has a record capacity raised to about seven times that of a CD (Compact Disk) a conventional optical disk, and enables information to be recorded and reproduced more than once; the coding system at the recording time on the DVD-R/W is MPEG2, one type of above-mentioned MPEG.

First, the configuration and operation of an information recording and reproducing system according to the embodiment will be discussed with reference to FIGS. 1 and 2A, 2B.

FIG. 1 is a block diagram to show a general configuration of the information recording and reproducing system of the embodiment. FIGS. 2A and 2B are block diagrams to show general configurations of a compression circuit and a decompression circuit.

As shown in FIG. 1, the information recording and reproducing system S of the embodiment is made up of a pickup 2 as record means and read means, an A/D (analog-digital) converter 3, a compression circuit 4, record buffer memory 5, an encoder 6, a record circuit 7, a reproduction circuit 8, a decoder 9, a reproduction buffer memory 10, a decompression circuit 11, a D/A (digital-analog) converter 12, a spindle motor 13, a CPU (central processing unit) 14 as acquisition means, setting means, storage control means, read and acquisition means, and calculation means, a servo circuit 15, an operation section 16, and a display section 17.

The pickup 2, the A/D converter 3, the compression circuit 4, the record buffer memory 5, the encoder 6, and the record circuit 7 make up an information record section R.

The pickup 2, the reproduction circuit 8, the decoder 9, the reproduction buffer memory 10, the decompression circuit 11, and the D/A converter 12 make up an information reproduction section P.

Further, as shown in FIG. 2A, the compression circuit 4 is made up of an adder 4a, a DCT (Discrete Cosine Transform) section 4b, a quantization section 4c, an inverse quantization section 4d, a variable-length coding section 4e, an inverse DCT section 4f, a motion detection section 4g, a motion compensation prediction section 4h, and a rate control section 4j.

Figure 2B:
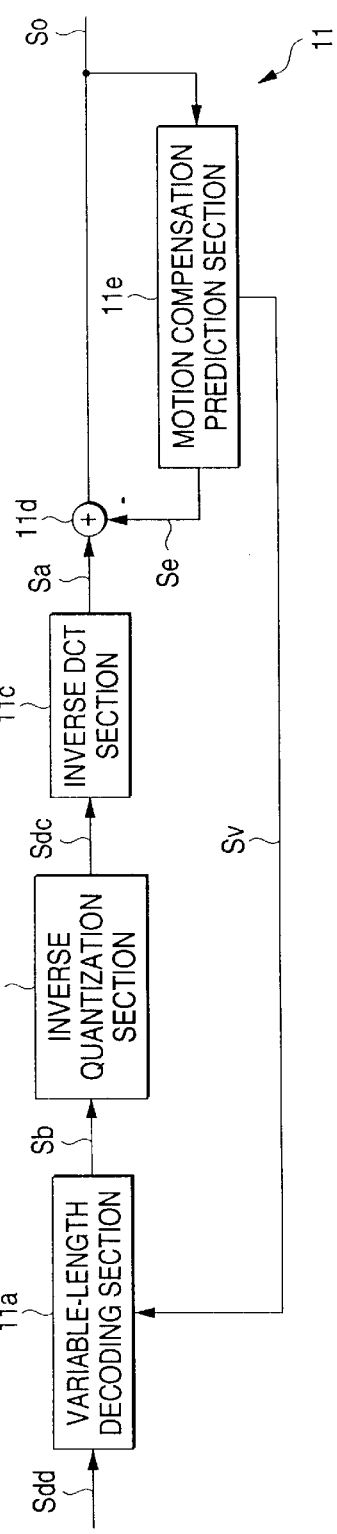

Further, as shown in FIG. 2B, the decompression circuit 11 is made up of a variable-length decoding section 11a, an inverse quantization section 11b, an inverse DCT section 11c, an adder 11d, and a motion compensation prediction section 11e.

The CPU 14 contains memory 14a as storage means whore data can be read and written.

Next, the general operation of the components will be discussed.

First, recording of external information on DVD-R/W 1 as a record medium will be discussed.

When an information signal Sin (analog signal) corresponding to the external information to be recorded (specifically, containing either or both of image information and voice information) is input, the A/D converter 3 converts the analog information signal Sin into a digital information signal Sd and outputs the digital information signal Sd to the compression circuit 4.

The compression circuit 4 compresses the input digital information signal Sd in conformity with the above-mentioned MPEG2 based on a control signal S5 output from the CPU 14 to generate a compressed information signal Spd and outputs the compressed information signal Spd to the record buffer memory 5.

Then, the record buffer memory 5 temporarily stores the input compressed information signal Spd as it is. At this time, the record buffer memory 5 always outputs a data amount signal Smr indicating the data amount of the compressed information signal Spd stored in the record buffer memory 5 to the CPU 14.

Next, the encoder 6 reads the compressed information signal Spd temporarily recorded in the record buffer memory 5 based on a control signal S4 output from the CPU 14 and encodes the compressed information signal Spd to generate an encode signal Sed, then outputs the encode signal Sed to the record circuit 7.

The record circuit 7 converts the input encode signal Sed into a record signal Sr for recording based on a control signal S2 output from the CPU 14 and outputs the record signal Sr to the pickup 2. At this time, the record circuit 7 applies so-called write strategy processing, etc., to the encode signal Sed to form pits shaped precisely corresponding to the information to be recorded on the DVD-R/W 1.

Then, based on the record signal Sr output from the record circuit 7, the pickup 2 drives a light source such as a semiconductor laser (not shown) in the pickup 2 to generate a light beam B such as laser light and applies the light beam B onto the information record side of the DVD-R/W 1 to form pits corresponding to the record signal Sr, thereby recording the information signal Sin on the DVD-R/W 1. At this time, the DVD-R/W 1 is turned at a predetermined number of revolutions by the spindle motor 13 driven based on a spindle control signal Ssm described later.

On the DVD-R/W 1, the pits corresponding to the record signal Sr are formed, for example, by a phase change method and the information signal Sin is recorded.

Next, the operation of reproducing information recorded on DVD-R/W 1 will be discussed.

When the information is reproduced, first the pickup 2 applies the light beam B for reproduction to the turning DVD-R/W 1 and generates a detection signal Sp corresponding to the pits formed on the DVD-R/W 1 based on the reflected light thereon, then outputs the detection signal Sp to the reproduction circuit 8.

Then, the reproduction circuit 8 amplifies the output detection signal Sp at a predetermined amplification factor based on a control signal S1 output from the CPU 14 and shapes the waveform of the detection signal Sp to generate a reproduction signal Spp, then outputs the reproduction signal Spp to the decoder 9.

The decoder 9 decodes the reproduction signal Spp according to the decode system corresponding to the encode system in the encoder 6 based on a control signal S3 output from the CPU Sdd to the reproduction buffer memory 10.

Then, the reproduction buffer memory 10 temporarily stores the input decode signal Sdd as it is. At this time, the reproduction buffer memory 10 always outputs a data amount signal Smp indicating the data amount of the decode signal Sdd stored in the reproduction buffer memory 10 to the CPU 14.

Next, the decompression circuit 11 reads the decode signal Sdd temporarily stored in the reproduction buffer memory 10 in conformity with the above-mentioned MPEG2 based on a control signal S6 output from the CPU 14 and subjects the read decode signal Sdd to decompression processing corresponding to the compression processing in the compression circuit 4 described above to generate a decompressed signal So, then outputs the decompressed signal So to the D/A converter 12.

The D/A converter 12 converts the decompressed signal So into analog form to generate an output signal Sout corresponding to the information signal Sin, then outputs the output signal Sout to the outside.

As the information is recorded and reproduced as described above, the CPU 14 outputs the control signals S1 to S6 so as to execute processing described later with reference to a flowchart based on the data amount signal Smp or Smr.

At this time, the operation section 16 outputs a command signal Sc corresponding to the operation performed by the user, etc., to the CPU 14, which then outputs the control signals S1 to S6 based on the command signal Sc.

In parallel with the operation, the CPU 14 generates a control signal Ss for performing servo control for the spindle motor 13 and the pickup 2 and outputs the control signal Ss to the servo circuit 15, which then generates the above-mentioned spindle control signal Ssm for controlling rotation of the spindle motor 13 based on the control signal Ss and outputs the spindle control signal Ssm to the spindle motor 13. Also, the servo circuit 15 generates a pickup control signal Ssp for tracking servo control and focus servo control in the pickup 2 and outputs the pickup control signal Ssp to the pickup 2, which then records the record signal Sr (information signal Sin) or detects the detection signal Sp while subjecting the light beam B to tracking servo control and focus servo control based on the pickup control signal Ssp.

The information required for the user to control the operation of the information recording and reproducing system S described above is displayed on the display section 17 based on a display signal Sdp from the CPU 14.

Next, the detailed operation of the compression circuit 4 and that of the decompression circuit 11 will be discussed with reference to FIGS. 2A and 2B.

First, the detailed operation of the compression circuit 4 will be discussed with FIG. 2A.

As shown in FIG. 2A, the digital information signal Sd input to the compression circuit 4 is input to the motion detection section 4g and the adder 4a. Image information of the digital information signal Sd is made up of a number of frame images and is digitalized for each of pixels making up each frame.

The motion detection section 4g calculates a motion vector for each frame in the digital information signal Sd and the corresponding vector signal Sv is output to the motion compensation prediction section 4h.

The motion vector will be discussed in detail. The motion vector is used for motion compensation processing executed when a moving image is compressed based on MPEG2.

That is, in the motion compensation processing, first the image to be coded is divided into macro blocks each containing a predetermined number of pixels, and the spatial position of the image with the minimum absolute value sum resulting from adding the absolute value of the difference between each pixel in each macro block and the corresponding pixel in either the preceding or following frame on the time axis with respect to all pixels in the macro block (namely, the image in either the preceding or following frame closest to the image in the macro block) is found.

The move relationship between the macro block and the image closest to it is adopted as the motion vector and the motion vector is coded as information indicating the image in either the preceding or following frame, whereby the image information can be coded with the actually coded information amount compressed considerably as compared with the case where the image information itself is coded as it is.

Next, the adder 4 subtracts a compensation signal Se output from the motion compensation prediction section 4h from the digital information signal Sd output to the adder 4a and outputs the result to the DCT section 4b as a subtraction signal Sa.

Then, the DCT section 4b subjects the subtraction signal Sa to DCT for compressing the information amount according to a known technology and outputs the result to the quantization section 4c as a transform signal Sdc.

Then, the quantization section 4c quantizes the transform signal Sdc so as to fit the bit rate indicated by a rate signal Srr described later to generate a quantization signal Sq, then outputs the quantization signal Sq to the variable-length coding section 4e and the inverse quantization section 4d.

Then, the inverse quantization section 4d subjects the quantization signal Sq to inverse quantization processing to generate an inverse quantization signal Siq, then outputs the inverse quantization signal Siq to the inverse DCT section 4f.

Then, the inverse DCT section 4f subjects the inverse quantization signal Siq to inverse DCT (inverse discrete cosine transform) according to a known technology and outputs the result to the motion compensation prediction section 4h as an inverse transform signal Sid.

Then, the motion compensation prediction section 4h performs motion compensation processing using frame-to-frame prediction in MPEG2 based on the motion vector contained in the vector signal Sv and the inverse transform signal Sid to generate the above-mentioned compensation signal Se for compressing the information amount, then outputs the compensation signal Se to the adder 4a.

On the other hand, the variable-length coding section 4e subjects the quantization signal Sq to variable-length coding processing and outputs the compressed information signal Spd provided by compressing and coding the original digital information signal Sd in MPEG to the record buffer memory 5.

At this time, the rate control section 4j generates the above-mentioned rate signal Srr for optimizing the bit rate at the quantizing time in the quantization section 4c based on the compressed information signal Spd and outputs the rate signal Srr to the quantization section 4c.

Next, the detailed operation of the decompression circuit 11 will be discussed with FIG. 2B.

As shown in FIG. 2B, the variable-length decoding section 11a subjects the decode signal Sdd input to the decompression circuit 11 to variable-length decoding processing based on the motion vector contained in the vector signal Sv from the motion compensation prediction section 11e and outputs the result to the inverse quantization section 11b as the above-mentioned quantization signal Sq.

Then, like the inverse quantization section 4b, the inverse quantization section 11b subjects the quantization signal Sq to inverse quantization processing to generate the above-mentioned transform signal Sdc, then outputs the transform signal Sdc to the inverse DCT section 11c.

Then, like the inverse DCT section 4f, the inverse DCT section 11c subjects the transform signal Sdc to inverse DCT according to a known technology and outputs the result to the adder 11d as the above-mentioned subtraction signal Sa.

Then, the adder 11d adds the above-mentioned compensation signal Se from the motion compensation prediction section 11e to the subtraction signal Sa and outputs the result to the D/A converter 12 as the above-mentioned decompressed signal So.

At this time, the motion compensation prediction section 11e performs motion compensation processing for the decompressed signal So, detects the above-mentioned motion vector, and outputs the motion vector to the variable-length decoding section 11a as the vector signal Sv. Also, the motion compensation prediction section 11e generates the above-mentioned compensation signal Se and outputs the compensation signal Se to the adder 11d.

Next, the data structure of the compressed information signal Spd generated based on MPEG2 in the compression circuit 4 will be outlined with reference to FIGS. 3A to 6C.

Figure 3A:
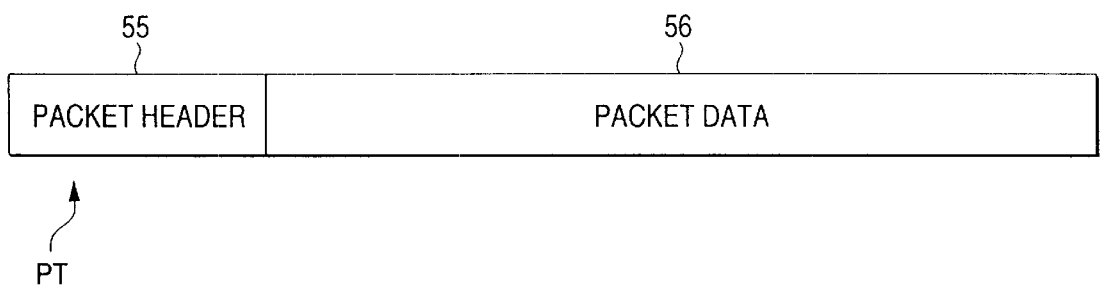
FIG. 3A is a drawing to show the format of a packet and FIG. 3B is a drawing to show the format of a pack.
Figure 3B:
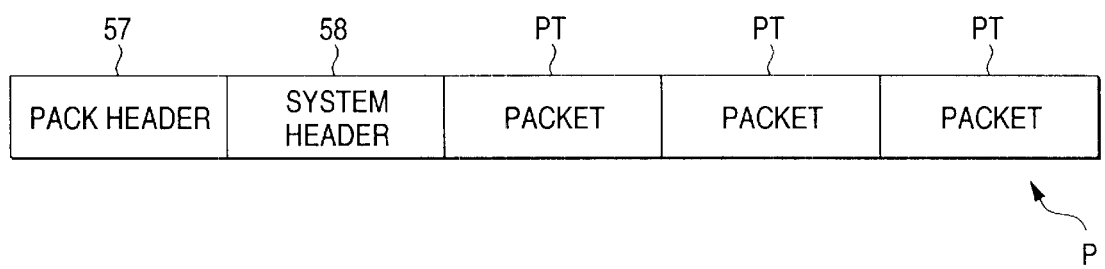
Figure 4:
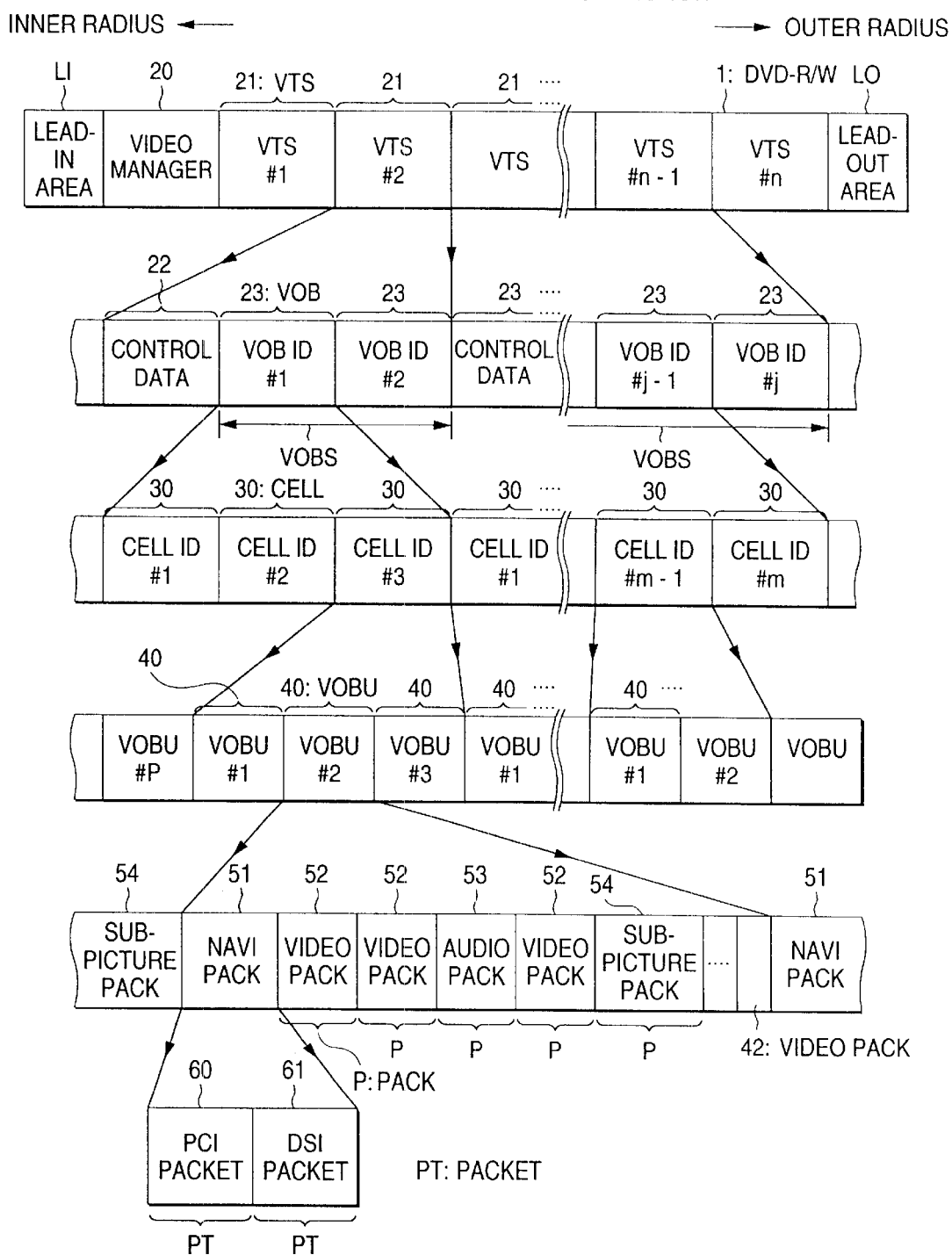
FIG. 4 is a drawing to show the format of data recorded on DVD-R/W 1.
Figure 5:
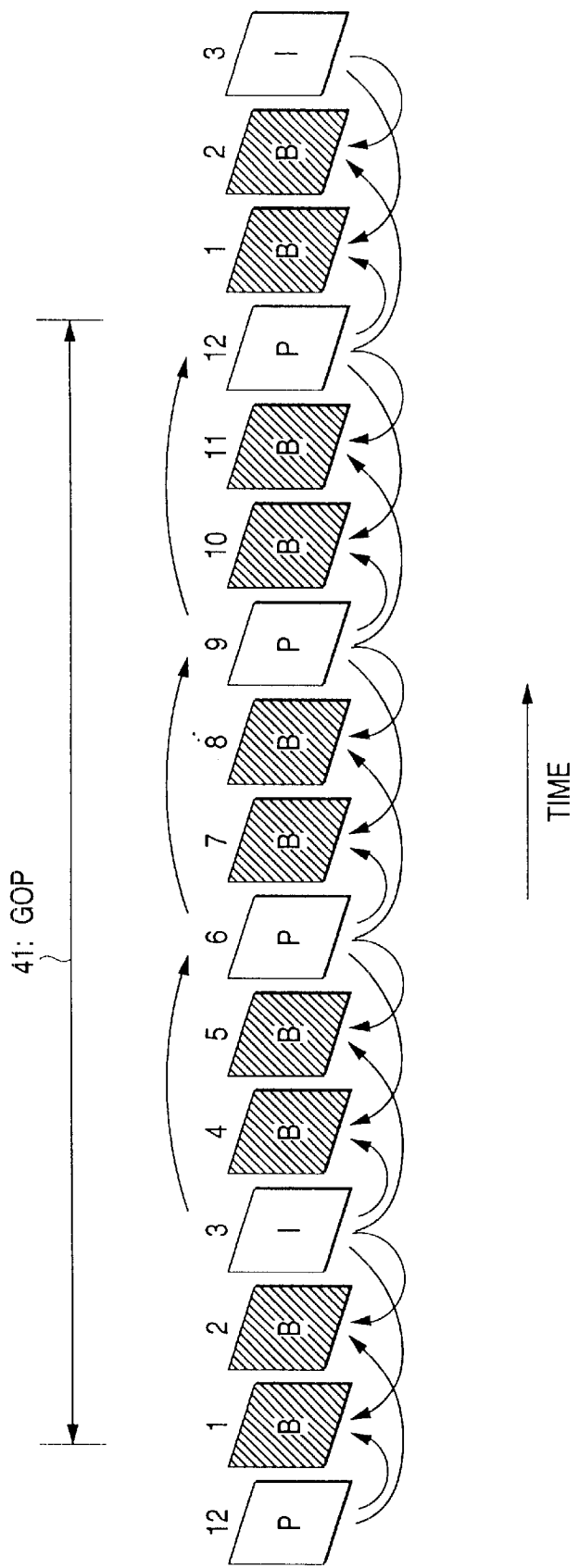
FIG. 5 is a drawing to show the configuration of GOP.
Figure 6A:
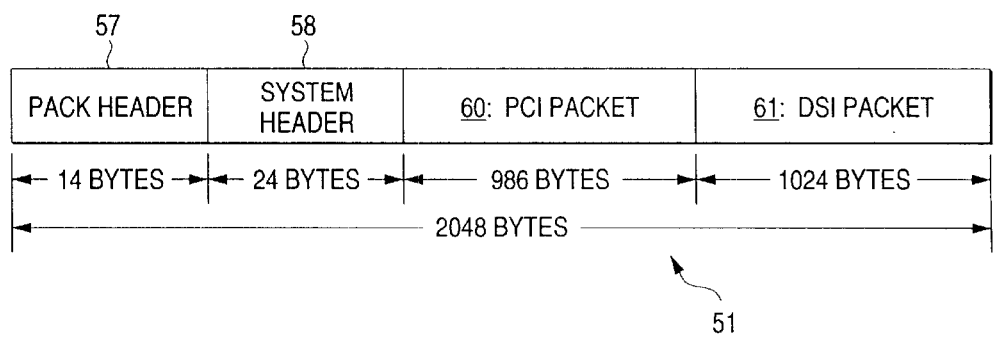
FIG. 6A is a drawing to show the format of a navigation pack.
Figure 6B:
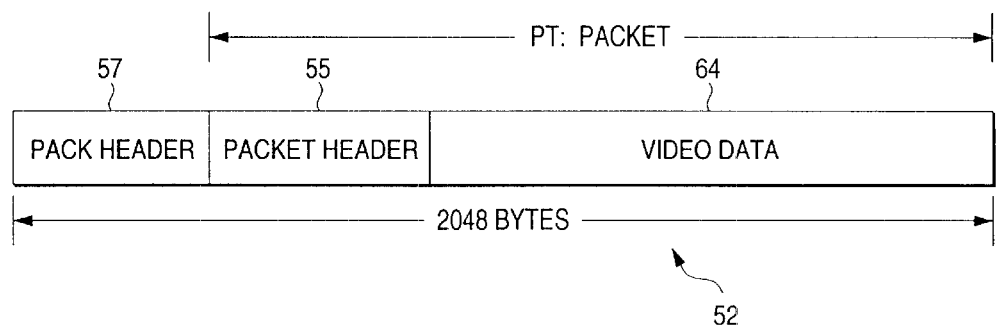
FIG. 6B is a drawing to show the format of a video pack.
Figure 6C:
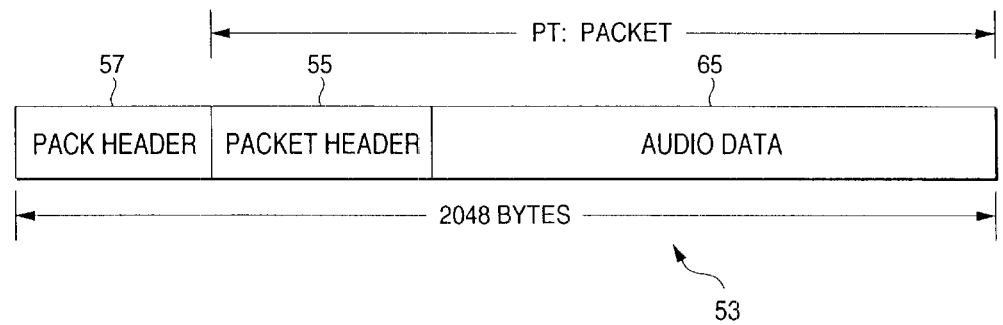
FIG. 6C is a drawing to show the format of an audio pack.

FIGS. 3A and 3B are drawings to show the formats of a packet and a pack. FIG. 4 is a drawing to show the format of data recorded on DVD-R/W 1. FIG. 5 is a drawing to show the configuration of GOP (Group Of Picture). FIGS. 6A to 6C are drawings to show the formats of packs.

The compressed information signal Spd is output as a data stream called a program stream (PS) in MPEG2.

The PS is made up of a plurality of PES (Packetized Elementary Stream) packets (simply, packets) described later as basic units.

The packet PT is provided by putting elementary stream (image information or voice Information data itself) into a packet, and consists of a PES packet header (simply, packet header) 55 and packet data 56, as shown in FIG. 3A.

The packet data 56 contains image data or audio data to be actually displayed or output.

The packet header 55 contains stream ID indicating the type of data contained in the packet data 56, PTS (Presentation Time Stamp), DTS (Decoding Time Stamp), and the like.

Here, DTS is time information in 90 kHz-units indicating the output time of picture data (data corresponding o a picture of one image) decoded from the reproduction buffer memory 10 for decoding a system stream (a generic name for information stream conforming to MPEG2), and PTS is time information in 90-kHz units indicating the time at which the image corresponding to the picture data is displayed actually.

When the packet data 56 is audio data, PTS and DTS become the same value, thus only PTS is contained as representation thereof.

PTS and DTS are contained in the packet header 55 only when the packet data 56 contains the top of an access unit (namely, each picture when image information is applied or AAU (Audio Access Unit) when audio information is applied).

Therefore, the size of the packet header 55 (the number of bits) changes depending on the presence or absence of PTS, DTS, etc., contained in the packet header 55.

A number of packets PTs shown in FIG. 3A are combined and further predetermined additional information is combined to form the above-mentioned system stream conforming to MPEG2.

Next, the PS of one form of the system stream will be generally discussed with reference to FIG. 3B.

The PS is made up of a number of packs and one pack P consists of a pack header 57, a system header 58, and a number of packets PTs, as shown in FIG. 3B.

The pack header 57 contains an SCR (System Clock Reference, namely, system time reference value), etc.

Here, the SCR describes the time at which the pack P containing the SCR arrives at the reproduction buffer memory 10 in 90-kHz units.

More particularly, the SCR indicates the read start time on the reproduction time axis to start inputting the data contained in each pack P to the reproduction buffer memory 10.

The size of the pack header 57 becomes the number of bytes of dummy data added to 14 bytes.

Further, the system data 58 contains information such as the size of the reproduction buffer memory 10. Whether or not the system header 58 is to be contained in one pack P can be specified as desired; to contain the system header 58, it is placed immediately following the pack header 57.

Next, the data format on the DVD-R/W 1 applied when the PS containing a number of the packs Ps shown in FIG.

3B is recorded on the DVD-R/W 1 will be discussed with reference to FIG. 4.

As shown in FIG. 4, the DVD-R/W 1 has a read-in area LI at the innermost radius of the disk and a read-out area LO at the outermost radius of the disk and comprises image information and voice information divided into VTSs (Video Title Sets) 21 (VTS#1 to VTS#n) each having an ID (identification) number and recorded between the read-in area LI and the read-out area LO. The VTSs 21 and a video manager 20 described later are combined corresponding to the above-mentioned PS.

The VTS 21 is a set of relevant titles (each a product presented by the producer for an audience, such as a movie). The relevent titles mean titles containing the same number of voice information and subimage information pieces (subimage information such as subtitles in a movie, etc.,) and having the same attributes of specifications, corresponding language, etc.,).

The video manager 20 is recorded at the top of the area in which each VTS is recorded. Information recorded as the video manager 20 is management information involved in the whole of the image information and the voice information recorded on the DVD-R/W, such as a title menu, information for protect ion against illegal copying, or an access table for accessing each title.

One VTS 21 is divided into a control data 22 (top area) and Vows 23 each having an ID number and recorded. The portion made up of the VOBs 23 is referred to as a VOB set (VOBS) to distinguish between the control data 22 forming a part of the VTS 21 and the portion made up of the VOBs 23 as the real body of the image information and the voice information.

Information such as PGCI (Program Chain Information) concerning a program chain of a logical partition comprising a number of cells (described later) in combination is recorded in the control data 22 recorded at the top of the VTS 21. The real portion of image information and voice information (image or voice itself other than control information) in addition to control information is recorded in each VOB 23.

Further, one VOB 23 is made up of a number of cells 30 each having an ID number.

Each VOB 23 consists of a number of complete cells 30 and one cell 30 does not extend across VOBs 23.

Each cell 30 is made up of a number of VOB units (VOBUs) 40 each having an ID number.

The VOB unit 40 refers to an information unit containing image information, voice information, and subimage information.

Each VOB unit 40 is made up of a navi (navigation) pack 51 storing predetermined information, a video pack 52 containing video data as image information, an audio pack 53 containing audio data as voice information, and a subpicture pack 54 containing subpicture data as subpicture information. Only image information is recorded as the video data and only voice information is recorded as the audio data. A packet PT containing text and graphic data as a subimage is recorded as the subpicture data.

Data is recorded so that the reproduction time corresponding to one VOB unit 40 (reproduction time corresponding to the data recorded between one navi pack 51 and the next navi pack 51) has a length ranging from 0.4 sec to 1 sec.

One VOB unit 40 always begins with the navi pack 51, but need not necessarily contain the video pack 52, the audio pack 53, or the subpicture pack 54. If the VOB unit 40 contains the packs, the number and order of the packs can be set arbitrarily.

Each of the video pack 52, the audio pack 53, or the subpicture pack 54 shown in FIG. 4 corresponds to the above-described pack P.

The video data, the audio data, or the subpicture data is recorded for each packet PT of a record unit into which the pack P is furthermore divided, but generally one pack P is formed of one packet PT on the DVD-R/W 1 in the embodiment.

Every video pack 52 contained in one VOB unit 40 is formed of one or more GOPs.

The GOP will be outlined with reference to FIG. 5.

FIG. 5 shows an example of frame images making up one GOP.

In the example in FIG. 5, one GOP 41 is made up of 12 frame images (in MPEG2, the number of frame images contained in one GOP 41 is not fixed). The frame image indicated by code I, called I picture (Intra-coded picture), is a frame image capable of reproducing a complete frame image by its own image alone.

The frame image indicated by code P, called P picture (Predictive-coded picture), is a prediction image generated by decoding the difference from a prediction image compensated and reproduced based on already decoded I picture or another P picture.

Further, the frame image indicated by code B, called B picture (Bidirectionally predictive-coded picture), is a prediction image reproduced using not only already decoded I picture or P picture, but also future I picture or P picture in time sequence recorded on the DVD-R/W 1 for prediction.

In FIG. 5, the prediction relationship (compensation relationship) between the pictures is indicated by an arrow.

On the other hand, the variable-rate system, in which the data amount contained in each GOP 41 is not constant as described above is adopted in MPEG2 used with the DVD-R/W 1 according to the embodiment.

That is, if each picture contained in one GOP 41 corresponds to a moving picture in rapid motion and the correlation between the pictures is small, the data amount for forming the pictures grows and therefore the data amount contained in one GOP 41 also grows.

In contrast, if each picture contained in one GOP 41 corresponds to a moving picture in not much rapid motion and the correlation between the pictures is large, the data amount for forming the pictures lessens and the data amount contained in one GOP 41 also lessens.

Next, the detailed formats of the navi pack 51, the video pack 52, and the audio pack 53 will be discussed.

First, as shown in FIGS. 4 and 6A, the nave pack 51, which is always contained in one VOB unit 40 and is described preceding video data, is made up of a DSI packet 61 of a packet PT containing retrieval information for retrieving the image, voice, etc., to be reproduced and displayed (specifically, address, etc., on the DVD-R/W 1 where the image, voice, etc., to be reproduced and displayed is recorded, and a PCI packet 60 of a packet PT containing information concerning reproduction and display control when the image or voice retrieved based on the data in the DSI packet 61 is displayed. In the two types of packets, neither PTS nor DTS is described in the packet header 55.

Each of the packets has stream ID 0xBF (in private stream 2 standard) and 0x00 and 0x01 as substream IDs are described following the packet header 55, making it possible to distinguish between the PCI packet 60 and the DSI packet 61. [124]

The substream ID is not contained in the MPEG2 standard and is proper to the DVD standard.

The PCI packet 60 contains highlight information defining display and operation applied when each option is selected by an audience. According to the highlight information, for example, screen display change responsive to option selection in an image displaying options to be selected by an audiance (a menu screen), the display position to be changed in response to the selection, a command for the selected option (instruction indicating the operation executed in response to the selected option), and the like are set.

Image information for displaying a frame, a selection button, etc., required for forming and displaying a menu screen is recorded as the subpicture data of the subimage information mentioned above.

The GOP 41 is the minimum image unit that can be reproduced singly, defined in the MPEG2 standard, and recorded at the top of each GOP 41 is the PTS indicating the reproduction time on the reproduction time axis at which the video data contained in the GOP 41 should be displayed.

Next, the video pack 52 will be discussed with reference to FIG. 6B.

As shown in FIG. 6B, the video pack 52 contains video data 64 compressed in MPEG2.

As the video data 64, only one type of image information is contained on one DVD-R/W 1.

When the top of an I picture in MPEG 2 exists in the packet PT, PTS and DTS are contained in the packet header 55.

The video pack 52 has stream ID 0×E0.

In FIG. 6B, the pack header 57 is followed by only one packet PT containing the video data 64, but dummy data may be inserted following the packet PT to adjust the data rate. In this case, the pack header 57, the packet PT, and the summary data become 2048 bytes in total.

The video data 64 is inserted into PS so that it does not cause an overflow or an underflow in the reproduction buffer memory 10 for the video data 64.

Next, the audio pack 53 will be discussed with reference to FIG. 6C.

As shown in FIG. 6C, the audio pack 53 contains audio data 65 compressed in a system called AC-3.

As described above, eight types of voice information can be recorded on DVD-R/W 1 and when the top of the AAU exists in the packet PT, PTS is described in the packet header 55.

The audio pack 53 has stream ID 0×BD (in private stream 1 standard) and substream ID 0×80–0×87. The stream number of voice information is defined according to the low-order three bits of the substream ID.

The four bytes containing the substream ID, called a private data area, are described at the top of the audio data 65 and contain information for reproduction in the AC-3 system. They are not contained in the MPEG2 standard and are proper to the DVD standard.

In FIG. 6C, the pack header 57 is followed by only one packet PT containing the audio data 65, but dummy data may be inserted following the packet PT to adjust the data rate as with the video pack 52. In this case, the pack header 57, the packet PT, and the summy data become 2048 bytes in total.

In the audio pack 53, the audio data 65 is inserted into PS so that it does not cause an overflow or an underflow in the reproduction buffer memory 10 (not shown) for the audio data 65.

Next, the coding parameters related to the invention and not yet described among the coding parameters of PTS, DTS, etc., described above will be discussed.

(1) VBV Delay

The VBV delay describes the time between the instant at which the picture stare code corresponding to each picture in PS is input to the reproduction buffer memory 10 and the instant at which the picture is decoded in a 90-kHz count.

That is, as described above, in the PS subjected to variable-length coding, the post-coded pictures differ in data size. Therefore, the information reproducing section P needs to determine what timing each picture should be decoded at.

More particularly, for example, if the picture is decoded at an early timing, not all data of the picture is stored in the reproduction buffer memory 10, thus the picture cannot be decoded, namely, the reproduction buffer memory 10 underflows.

In contrast, if the picture is decoded at a late timing, the reproduction buffer memory 10 overflows.

The information reproduction section P in the embodiment reads the VBV delay value added after a picture start code is input to the reproduction buffer memory 10, and waits for the time described in the VBV delay after the picture start code is input, then decodes the picture.

(2) Picture Size

The picture size is a coding parameter for indicating the data amount of each picture. The coding parameter is necessary for the information recording section R to maintain the continuity of simulation of the reproduction buffer memory 10 before and after scene transition recording.

That is, to maintain the continuity, the picture size provided by totalizing all pictures already input to the reproduction buffer memory 10 becomes necessary just before scene transition recording.

When the first decoding is started, the reproduction buffer memory 10 is empty and no pictures are input thereto. Thus, the information reproducing section P may recognize the picture size of the pictures to be decoded later.

However, during reproducing, normally the data corresponding to several pictures is stored in the reproduction buffer memory 10.

Each of the pictures is decoded, then output from the reproduction buffer memory 10. This means that when each picture is decoded, the data amount of the picture is subtracted from the stored data amount in the reproduction buffer memory 10. At this time, the information recording section R continues to simulate the stored data amount in the reproduction buffer memory 10.

(3) Temporary Reference

As described above, in PS, images form GOP 41. In this case, the temporary reference describes the display order of pictures in the GOP 41.

That is, in the GOP 41, the order of the pictures contained in the PS differs from the display order of the pictures. This means that the pictures are decoded in the order they are input to the reproduction buffer memory 10, but the picture decoding order differs from the actual picture display order because of the characteristics of compression decoding in MPEG2 (see FIG. 5).

When the first coding is started, the information recording section R can set the structure of the GOP 41 as desired.

On the other hand, when scene transition recording is performed in GOP 41 units, a new appropriate GOP 41 can be selected and coding can be started. However, when scene transition recording is performed in picture units, to follow the standard as continuous GOP 41 and maintain the continuity as the temporary reference before and after scene transition recording, the information recording section R needs to previously recognize the structure of GOP 41 before performing scene transition recording.

(4) Picture Coding Type

The picture coding type is a coding parameter for indicating the type of coding each picture in GOP 41, namely, I picture, P picture, or B picture.

At this time, the picture coding type does not introduce any problem when scene transition recording is performed in GOP 41 units. However, when scene transition recording is performed in picture units, the structure of GOP 41 just before scene transition recording is performed needs to be recognized to match the picture order in GOP 41 with the MPEG2 standard before and after scene transition recording.

Next, the operation of scene transition recording according to the invention will be discussed with reference to FIGS. 7 to 11.

Figure 7A:
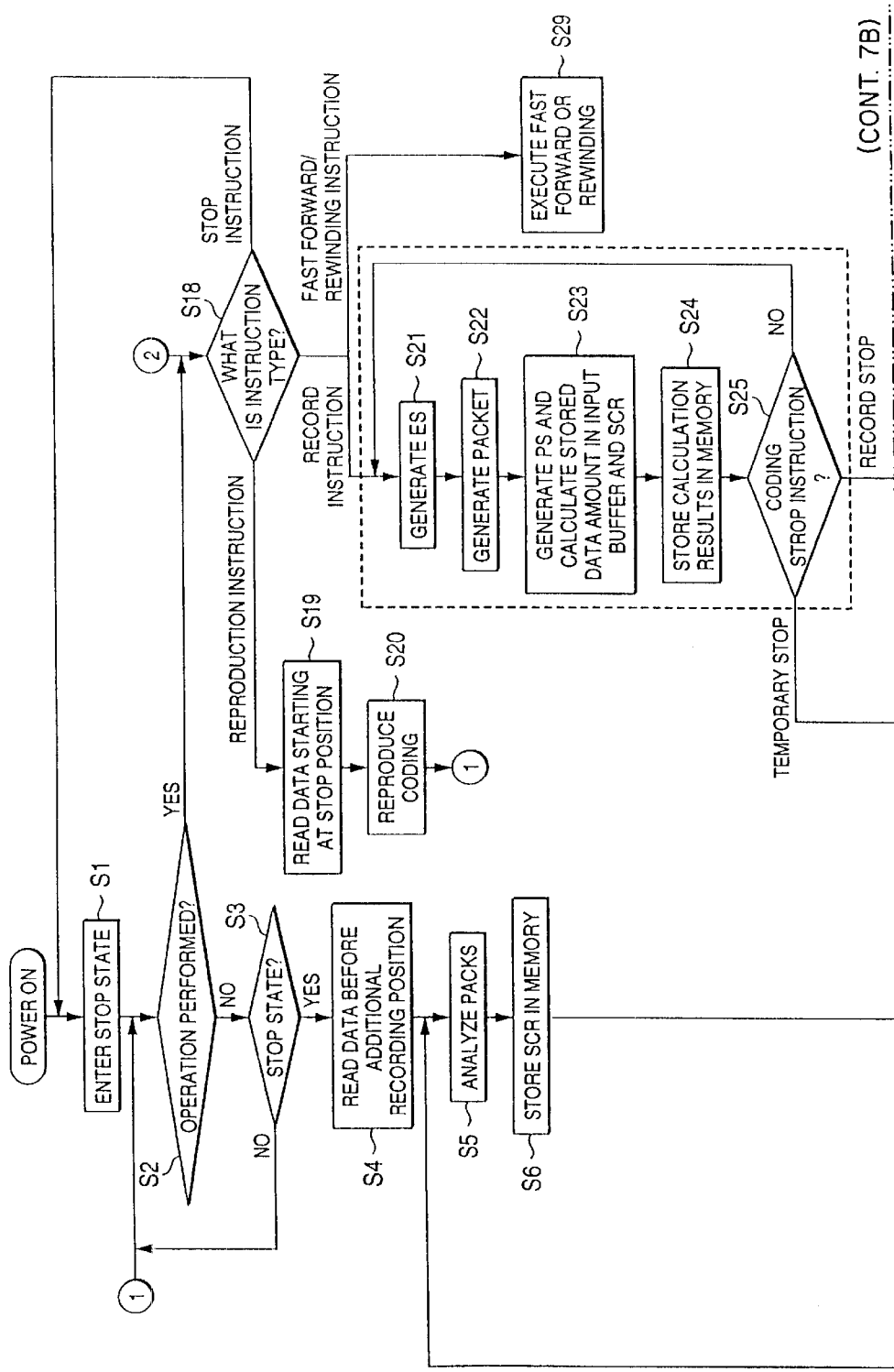

Scene transition recording control shown in FIGS. 7A and 7B is mainly executed by the CPU 14.

In the description of scene transition recording to follow, the reproduction buffer memory 10 functions as buffer memory in two ways.

That is, for the above-mentioned elementary stream, the reproduction buffer memory 10 functions as a VBV buffer. Each picture in the elementary stream is input to the reproduction buffer memory 10 at the bit rate described in a sequence header used for locating the start of each GOP 41 in random access executed in GOP 41 units at the reproducing time, and is output from the reproduction buffer memory 10 after the expiration of the time described as the above-mentioned VBV delay, then is decoded.

On the other hand, for system-layer data on the MPEG2 standard, the reproduction buffer memory 10 functions as an input buffer. Each pack P as system-layer data is input to the reproduction buffer memory 10 at the time described in the above-mentioned SCR and is output from the reproduction buffer memory 10 at the time described in the above-mentioned DTS.

Further, in the following scene transition recording, it is assumed that information is already recorded on the DVD-R/W 1 in conformity with MPEG2.

Based on the prerequisites, in the scene transition recording of the invention, it is assumed that power of the information recording and reproducing system S is turned on in the beginning, then spindle servo control, focus servo control, and the like are started and the scene transition recording position is found, then the information recording and reproducing system S is in a stop state (step S1) as shown in FIG. 7A.

Whether or not some operation is performed on the operation section 16 is determined at step S2. If no operation is performed (N at step S2), then whether or not the information recording and reproducing system S is still in the stop state is determined at step S3.

If the information recording and reproducing system S is not in the stop state (N at step S3), control returns to step S2. If the information recording and reproducing system S is still in the stop state (Y at step S3), then PS already recorded a predetermined time before the scene transition recording position on the DVD-R/W 1 (simply shown as additional recording position in FIG. 7A) at step S4.

The contents of the packs in the read PS are analyzed at step S5 and the value of the SCR described in each of the packs Ps is stored in the memory 14a at step S6.

Next, the type of header positioned following the read pack P is determined at step S7.

If the determination result is the packet header 57, PTS and DTS are extracted for each PS identified by the stream ID and are stored in the memory 14a at step S8.

Then, whether or not the type of pack P indicated in the stream ID is the video pack 52 is determined at step S9.

If the type of pack P is the video pack 52 (Y at step S9), the VBV delay, picture size, temporary reference, and picture coding type described for each picture in the video pack 52 are extracted and stored in the memory 14a at step S10, then control goes to step S13.

On the other hand, if it is determined at step S7 that the header type is the system header 58, then the corresponding SCR is extracted and stored in the memory 14a at step S11 and information concerning the input buffer is extracted for each stream identified by each stream ID and is stored in the memory 14a at step S12, then control goes to step S13.

While steps S4 to S12 are executed, whether or not the pickup 2 moves to the scene transition recording position on the DVD-R/W 1 is determined at step S13. If the pickup 2 does not moves to the position (N at step S13), control returns to step S5 and steps S5 to S12 are repeated.

On the other hand, it is determined at step S13 that the pickup 2 moves to the scene transition recording position (Y at step S13), then the SCR indicating the stored data amount in the reproduction buffer memory 10 (input buffer) at the scene transition recording position is calculated by a method described later at step S14, the actual storeddata amount in the input buffer at the position is calculated by a method described later at step S15, and the calculation results and the coding parameters of the temporary reference and the picture coding type acquired at step S10 are used to initialize the compression circuit 4 at step S16. At this time, for the temporary reference and the picture coding type, the compression circuit 4 is initialized so as to follow the GOP 41 standard in MPEG2 (see FIG. 5) based on the temporary reference and the picture coding type acquired at step S10.

Whether or not the power is turned off is checked at step S17. If the power is turned off (Y at step S17), the processing is terminated; if the power is not turned off (N at step S17), control returns to step S2 and the above-described processing is repeated.

Next, if some operation command is entered through the operation section 16 (Y at step S2), control goes to step S18 and the contents of the command are recognized.

If the command contents are a reproduction instruction, rewinding is executed to reproduce data and data is read starting at the rewinding position at step S19 and the information reproducing section P performs reproduction processing at step S20. After completion of the reproduction processing, control returns to step S2 and the above-described operation is repeated.

On the other hand, if the command contents are a stop instruction at step S18, control returns to step S1; if the command contents are a fast forward/rewinding instruction, fast forward or rewinding processing is performed in response to the instruction at step S29.

If the command contents are a record instruction (scene transition recording instruction) at step S18, the following coding processing is started:

First, the VBV delay acquired at step S10 is used to calculate the VBV delay at the scene transition recording position by processing described later and an elementary stream (ES) is generated at step S21. Next, the DTS and PTS acquired at step S8 are used to calculate PTS and DTS at the scene transition recording position and packet PT is generated at step S22. Further, the stored data amount in the reproduction buffer memory 10 as the input buffer at the scene transition recording position and the corresponding SCR are calculated and PS is generated at step S23, then the calculation results at steps S21 to S23 are stored in the memory 14a at step S24.

Whether or not a coding stop instruction is entered through the operation section 16 is checked at step S25. If no coding stop instruction is entered, control returns to step S21 and the operation is repeated. On the other hand, if a temporary stop instruction of recording is entered as the stop instruction, control goes to step S26 and the compression circuit 4 is initialized by a method similar to that at step S16 based on the calculation results stored in the memory 14a at step S24 and the temporary reference and the picture coding type acquired at step S10. Next, whether or not the power is turned off is checked at step S27. If the power is turned off (Y at step S27), the processing is terminated; if the power is not turned off (N at step S27), control returns to step S18 and the above-described processing is repeated.

If a record stop instruction other than temporary stop is entered at step S25 to start scene transition recording at the rewinding or fast forward position after rewinding or fast forward is performed, control goes to step S28 and whether or not the power is turned off is checked. If the power is turned off (Y at step S28), the processing is terminated; if the power is not turned off (N at step S28), control returns to step S2 and the above-described processing is repeated.

Next, calculation of the VBV delay at step S21 in the scene transition recording described above will be discussed in detail with reference to FIG. 8.

Generally, the stored data amount in the reproduction buffer memory 10 as the VBV buffer is not zero just before scene transition recording is performed (namely, at the end of the previous recording).

Then, as shown in FIG. 8, the VBV delay corresponding to the first picture in the scene transition recording can be calculated from the VBV delay just before the scene transition recording is performed (acquired at step S10).

That is, letting the VBV delay corresponding to the picture just before the scene transition recording is performed be VBV delay (n), the VBV delay corresponding to the picture just after the scene transition recording is started be VBV delay (n+1), the stored data amount in the reproduction buffer memory 10 after the picture just before the scene transition recording is started is stored be stored data amount (n), the size of the picture just before the scene transition recording (data amount) be picture size (n), and the stored data amount in the reproduction buffer memory 10 after the picture just after the scene transition recording is started is stored be stored data amount (n+1), $$\text{VBV delay } (n+1) = \{\text{stored data amount } (n+1)/(\text{bit rate})\} \times 90000 \quad \text{[Expression 1]}$$

where stored data amount (n+1)=stored data amount (n)−(picture size (n))+(bit rate)/(frame rate of picture), and stored data amount $(n)$=VBV delay $(n)$/900000×(bit rate).

Next, calculation of the stored data amount in the input buffer at steps S15 and S23 in the scene transition recording described above will be discussed in detail with reference to FIGS. 9 and 10.

To start scene transition recording, the information recording section R needs to restart simulating the stored data amount in the reproduction buffer memory 10. To restart simulating the stored data amount in the reproduction buffer memory 10, the total value of the sizes of the pictures already stored in the reproduction buffer memory 10 just before the scene transition recording is started may be found. Thus, when each of the pictures is decoded, if the picture size is subtracted from the stored data amount in the reproduction buffer memory 10, simulating the stored data amount can be restarted.

As described above, the information recording section R simulates the reproduction buffer memory 10 as two types of buffer memory, namely, the VBV buffer and the input buffer.

The stored data amount in the VBV buffer can be calculated if the VBV delay described for each picture is used to acquire the VBV delay just before scene transition recording. That is, specifically, letting the VBV delay corresponding to the picture just before the scene transition recording is performed be VBV delay (n), the stored data amount in the reproduction buffer memory 10 after the picture just before the scene transition recording is started is stored be stored data amount (n), the size of the picture just before the scene transition recording be picture size (n), and the stored data amount in the reproduction buffer memory 10 after the picture just after the scene transition recording is started is stored be stored data amount (n+1), $$\text{Stored data amount } (n+1) = \text{stored data amount } (n) - (\text{picture size } (n)) + (\text{bit rate})/(\text{frame rate of picture}) \quad \text{[Expression 2]}$$

where stored data amount (n)=VBV delay (n)/900000×(bit rate).

On the other hand, the stored data amount in the input buffer needs to be calculated with the above-mentioned SCR and DTS as clues because information based on which the stored data amount is calculated is not described for each picture.

That is, let the picture just before scene transition recording be Pic (n), the DTS of the picture be DTS (n), and the SCR of the pack P just before scene transition recording be SCR (i). Now, assume that $$DTS(n-m-1) \leq SCR(i) < DTS(n-m) \quad \text{[Expression 3]}$$

Figure 9:
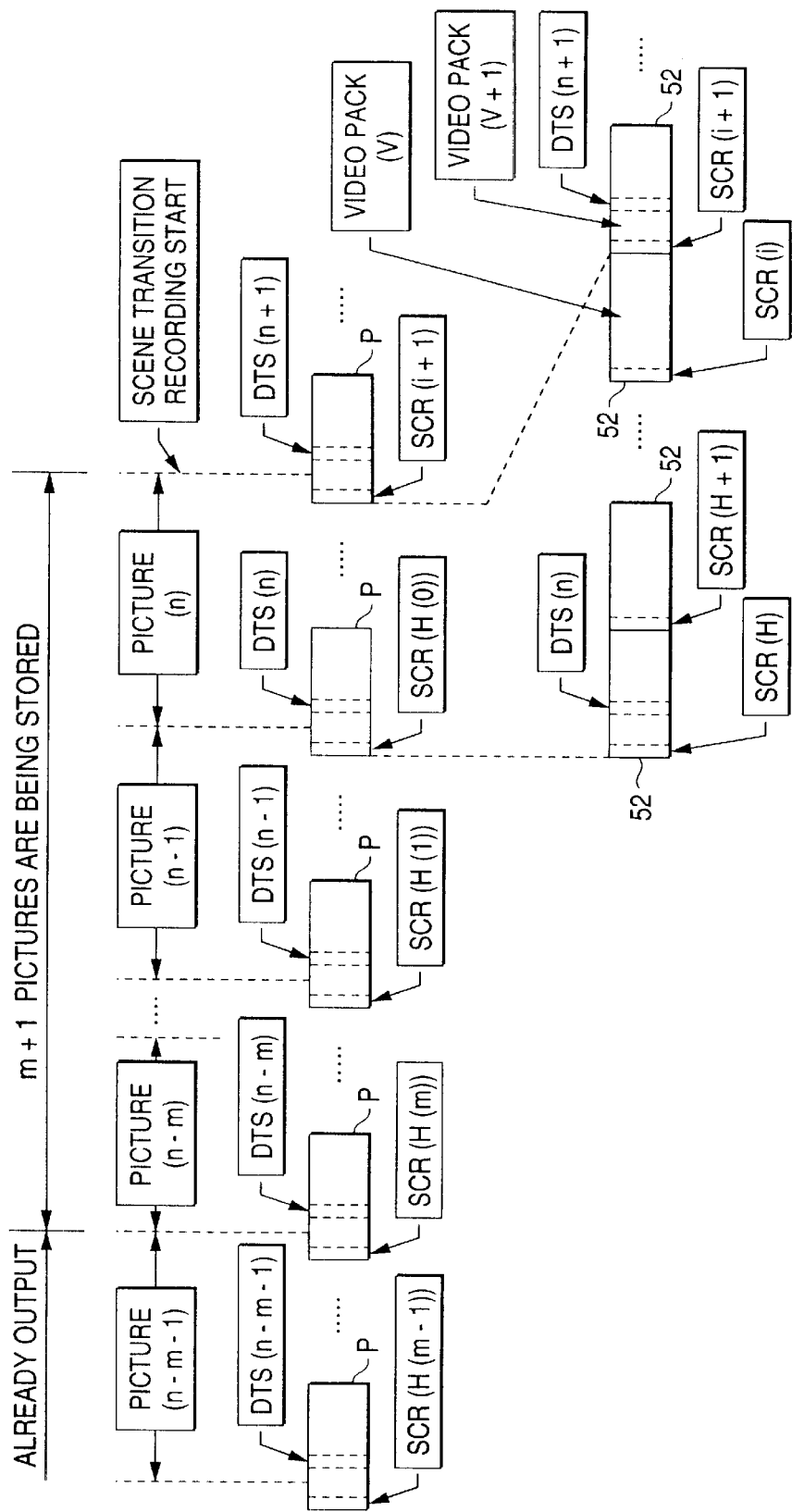
FIG. 9 is a drawing to describe continuity of the stored data amount in an input buffer (I)

As shown in FIG. 9, Pic (n−m−1) is decoded and is output from the reproduction buffer memory 10 as the input buffer, but m+1 pictures of Pic (n−m) to Pic (n) are stored in the reproduction buffer memory 10.

Therefore, to restart simulating the reproduction buffer memory 10 as the input buffer, it is necessary to calculate the sum total of the sizes of the m+1 pictures.

That is, specifically, as shown in FIGS. 9 and 10, letting the size of the nth picture be Pic-Size (n), $$\text{Stored data amount in input buffer} = \text{Pic-Size } (n-m) + \text{Pic-Size } (n-m+1) + \text{Pic-Size } (n-m+2) + \ldots + \text{Pic-Size } (n) \quad \text{[Expression 4]}$$

Next, calculation of the SCR at steps S14 and S23 in the scene transition recording described above will be discussed in detail with reference to FIG. 11.

SCR (n+1) of the pack P corresponding to the picture just after scene transition recording is started can be calculated from the stored data amount in the reproduction buffer memory 10 as the input buffer when the scene transition recording is started and SCR (n) of the pack P corresponding to the picture just before the scene transition recording is started (acquired at step S6 or S11).

In this case, as shown in FIG. 11, if the reproduction buffer memory 10 (input buffer) has a sufficiently available capacity, SCR (n+1) becomes a value resulting from adding a predetermined constant ΔSCR to SCR (n); on the other hand, if the reproduction buffer memory 10 has no available capacity, time information when a sufficiently available capacity occurs is described as SCR (n+1).

Specifically, if the reproduction buffer memory 10 has a sufficiently available capacity, $$SCR(n+1) = SCR(n) + \Delta SCR \quad \text{[Expression 5]}$$

For example, ΔSCR is found as follows:

ΔSCR=pack length/(multiplexing rate×50)×system clock frequency

For example, the pack length may be 2048 bytes, the multiplexing rate may be 25200, and the system clock frequency may be 27 MHz.

Last, calculation of the PTS and DTS at step S22 in the scene transition recording described above will be discussed in detail.

Generally, PTS (n+1) and DTS (n+1) of the pack P corresponding to the picture just after scene transition recording is started can be calculated from DTS (n) and PTS (n) of the pack P corresponding to the picture just before the scene transition recording is started (acquired at step S8).

That is, specifically, $$DTS(n+1)=DTS(n)+3003\times M$$

$$PTS(n+1)=PTS(n)+3003 \quad \text{[Expression 7]}$$

where M is the number of pictures contained between one I or P picture appearing and another I or P picture appearing.

As described above, according to the scene transition recording in the embodiment, the old coding parameter corresponding to the PS just before scene transition recording is started is acquired and a new coding parameter is set so as to continue with the old coding parameter, then the scene transition recording is performed while coding is executed. Thus, to reproduce PSs before and after the scene transition recording, the PSs coded based on the continuous coding parameters are reproduced; they can be reproduced without becoming discontinuous before and after the scene transition recording.

To record a PS after scene transition recording so as to continue with a PS before scene transition recording, at the termination of recording the PS before scene transition recording, the corresponding old coding parameter is read out and acquired from the memory 14a and is used as a new coding parameter to start coding the PS after scene transition recording. Further, at the termination of recording the PS after scene transition recording, the corresponding new coding parameter is stored in the memory 14a in place of the old coding parameter. Thus, even when the PS after scene transition recording is the PS to be recorded continuing with the PS before scene transition recording, the continuity of the coding parameters is provided reliably and new PS can be recorded.

To record a PS after scene transition recording so as to update a part of a PS before scene transition recording, the PS before scene transition recording, recorded in the area adjacent to the top of the area in which new PS is to be recorded is read and old coding parameter is calculated based on the read PS. Further, a new coding parameter is set so as to continue with the calculated old coding parameter and the PS after scene transition recording is coded. Thus, even when new PS is the PS to be recorded so as to update a part of the PS before scene transition recording, the continuity of the coding parameters is provided reliably and new PS can be recorded.

PSs before and after scene transition recording are coded in MPEG2 and a new coding parameter is set so that the coding parameters of VBV delay, picture size, temporary reference, picture coding type, SCR, PTS, and DTS at least are made to continue. Thus, the continuity of coding between the PSs before and after the scene transition recording can be maintained reliably, and the PSs can also be reproduced while the continuity is maintained between the PSs before and after the scene transition recording.

In the embodiment, the VBV delay, picture size, temporary reference, picture coding type, SCR, PTS, and DTS of the coding parameters in MPEG2 have been described, but the invention can also be applied to any other coding parameter.

Further, in the embodiment, coding using MPEG2 has been mainly described; in addition, the invention can also be applied to scene transition recording using coding in any other MPEG system.

[Advantages of the Invention]

As described above, according to the first aspect of the invention, the old coding parameter is acquired and the new coding parameter is set so as to continue with the old coding parameter, then the new record information is recorded while coding is executed. Thus, to reproduce the old record information and the new record information, the old record information and the new record information coded based on the continuous coding parameters are reproduced; the old record information and the new record information can be reproduced without becoming discontinuous therebetween.

Therefore, to reproduce the old record information and the new record information, the record information can be reproduced smoothly without becoming discontinuous.

According to the second aspect of the invention, in addition to the advantage of the invention as set forth in the first aspect, at the termination of recording the old record information, the corresponding old coding parameter is read out and acquired from the storage means and is used as new coding parameter to start coding the new record information. Further, at the termination of recording the new record information, the corresponding new coding parameter is stored in the storage means in place of the old coding parameter. Thus, even when the new record information is the record information to be recorded continuing with the old record information, the continuity of the coding parameters is provided reliably and the new record information can be recorded.

According to the third aspect of the invention, in addition to the advantage of the invention as set forth in the first aspect, the old record information recorded in the area adjacent to the top of the area in which new record information is to be recorded is read and old coding parameter is calculated based on the read old record information. Further, a new coding parameter is set so as to continue with the calculated old coding parameter and the new record information is coded. Thus, even when the new record information is the new record information to be recorded so as to update a part of the old record information, the continuity of the coding parameters is provided reliably and the new record information can be recorded.

According to the forth aspect of the invention, in addition to the advantage of the invention as set forth in any of the first to third aspects, to code the old record information and the new record information in MPEG, a new coding parameter is set so that the coding parameters of VBV delay, picture size, temporary reference, picture coding type, SCR, PTS, and DTS at least are made to continue. Thus, the continuity of coding between the old record information and the new record information can be maintained reliably, and the old record information and the new record information can also be reproduced while the continuity is maintained between the old record information and the new record information.

According to the fifth aspect of the invention, the old coding parameter is acquired and the new coding parameter is set so as to continue with the old coding parameter, then the new record information is recorded while coding is executed. Thus, to reproduce the old record information and the new record information, the old record information and the new record information coded based on the continuous coding parameters are reproduced; the old record information and the new record information can be reproduced without becoming discontinuous therebetween.

Therefore, to reproduce the old record information and the new record information, the record information can be reproduced smoothly without becoming discontinuous.

According to the sixth aspect of the invention, in addition to the advantage of the invention as set forth in the fifth aspect, at the termination of recording the old record information, the corresponding old coding parameter is read out and acquired from the storage means and is used as new coding parameter to start coding the new record information. Further, at the termination of recording the new record information, the corresponding new coding parameter is stored in the storage means in place of the old coding parameter. Thus, even when the new record information is the record information to be recorded continuing with the old record information, the continuity of the coding parameters is provided reliably and the new record information can be recorded.

According to the seventh aspect of the invention, in addition to the advantage of the invention as set forth in the fifth aspect, the old record information recorded in the area adjacent to the top of the area in which new record information is to be recorded is read and old coding parameter is calculated based on the read old record information. Further, a new coding parameter is set so as to continue with the calculated old coding parameter and the new record information is coded. Thus, even when the new record information is the new record information to be recorded so as to update a part of the old record information, the continuity of the coding parameters is provided reliably and the new record information can be recorded.

According to the eighth aspect of the invention, in addition to the advantage of the invention as set forth in the fifth to seventh aspects, to code the old record information and the new record information in MPEG, a new coding parameter is set so that the coding parameters of VBV delay, picture size, temporary reference, picture coding type, SCR, PTS, and DTS at least are made to continue. Thus, the continuity of coding between the old record information and the new record information can be maintained reliably, and the old record information and the new record information can also be reproduced while the continuity is maintained between the old record information and the new record information.

What is claimed is:

1. An information recording method for coding and recording new record information to be recorded on a record medium on which old record information is already coded and recorded, said information recording method comprising the steps of:
   acquiring an old coding parameter of a coding parameter used to code the old record information;
   setting a new coding parameter of a coding parameter used to code the new record information so as to continue with the acquired old coding parameter; and
   coding the new record information using the setup new coding parameter and recording the new record information on the record medium.

2. The information recording method as claimed in claim 1 wherein the new record information is new record information to be recorded on the record medium so as to continue with the old record information, wherein said acquisition step comprises the sub-steps of:
   storing the old coding parameter corresponding at the termination of recording the old record information in storage means; and
   reading and acquiring the stored old record information when the new record information is recorded;
   wherein said setting step sets the read old coding parameter as a new coding parameter; and
   wherein said recording step starts coding the new record information using the setup new coding parameter and stores the new coding parameter corresponding at the termination of recording the new record information in the storage means in place of the old coding parameter.

3. The information recording method as claimed in claim 1 wherein the new record information is new record information to be recorded on the record medium so as to update a part of the old record information;
   wherein said acquisition step comprises the sub-steps of:
   reading adjacent old record information of the old record information recorded on the record medium adjacent to the top of an area of the record medium in which the old record information of the part is recorded from the record medium; and
   calculating the old coding parameter corresponding at the termination of recording the adjacent old record information based on the read adjacent old record information.

4. The information recording method as claimed in claim 1, wherein coding of the old record information and coding of the new record information are compression coding executed based on MPEG (Moving Picture Experts Group); and
   wherein the coding parameters include at least coding parameters of VBV (Video Buffering Verifier) delay, picture size, temporary reference, picture coding type, SCR (System Clock Reference), PTS (Presentation Time Stamp), and DTS (Decoding Time Stamp).

5. An information recording system for coding and recording new record information to be recorded on a record medium on which old record information is already coded and recorded, said information recording system comprising:
   acquisition means for acquiring an old coding parameter of a coding parameter used to code the old record information;
   setting means for setting a new coding parameter of a coding parameter used to code the new record information so as to continue with the old coding parameter; and
   recording means for coding the new record information using the setup new coding parameter and recording the new record information on the record medium.

6. The information recording system as claimed in claim 5 wherein the new record information is new record information to be recorded on the record medium so as to continue with the old record information;
   wherein said acquisition means comprises:
   storage means for storing data;
   storage control means for storing the old coding parameter corresponding at the termination of recording the old record information in the storage means; and
   read and acquisition means for reading and acquiring the stored old record information when the new record information is recorded
   wherein said setting means sets the read old coding parameter as a new coding parameter; and wherein said recording means starts coding the new record information using the setup new coding parameter and stores the new coding parameter corresponding at the termination of recording the new record information in the storage means in place of the old coding parameter.

7. The information recording system as claimed in claim 5 wherein the new record information is new record information to be recorded on the record medium so as to update a part of the old record information;

wherein said acquisition means comprises:

read means for reading adjacent old record information of the old record information recorded on the record medium adjacent to the top of an area of the record medium in which the old record information of the part is recorded from the record medium; and calculation means for calculating the old coding parameter corresponding at the termination of recording the adjacent old record information based on the read adjacent old record information.

8. The information recording system as claimed in claim 5, wherein coding of the old record information and coding of the new record information are compression coding executed based on MPEG; and wherein the coding parameters include at least coding parameters of VBV delay, picture size, temporary reference, picture coding type, SCR, PTS, and DTS.

* * * * *